(12) United States Patent
Dennerlein et al.

(10) Patent No.: US 9,047,498 B2
(45) Date of Patent: Jun. 2, 2015

(54) METHOD FOR RECONSTRUCTING A RECONSTRUCTION DATA SET CONTAINING TWO-DIMENSIONAL VIRTUAL X-RAY IMAGES

(71) Applicant: SIEMENS AKTIENGESELLSCHAFT, Munich (DE)

(72) Inventors: Frank Dennerlein, Forchheim (DE); Anna Jerebko, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 366 days.

(21) Appl. No.: 13/688,854

(22) Filed: Nov. 29, 2012

(65) Prior Publication Data
US 2013/0136333 A1 May 30, 2013

(30) Foreign Application Priority Data
Nov. 29, 2011 (DE) .......................... 10 2011 087 337

(51) Int. Cl.
*G06K 9/00* (2006.01)
*G06T 11/00* (2006.01)
(52) U.S. Cl.
CPC ............... *G06K 9/00* (2013.01); *G06T 11/008* (2013.01); *G06T 2211/436* (2013.01)

(58) Field of Classification Search
None
See application file for complete search history.

(56) References Cited

U.S. PATENT DOCUMENTS

| 7,760,924 | B2 | 7/2010 | Ruth et al. |
| 2007/0291895 | A1 | 12/2007 | Yin et al. |
| 2009/0034684 | A1 | 2/2009 | Bernard et al. |
| 2009/0080752 | A1 | 3/2009 | Ruth et al. |
| 2010/0166267 | A1 | 7/2010 | Zhang et al. |

*Primary Examiner* — Atiba O Fitzpatrick
(74) *Attorney, Agent, or Firm* — Laurence A. Greenberg; Werner H. Stemer; Ralph E. Locher

(57) ABSTRACT

A method reconstructs a reconstruction data set containing virtual X-ray images of projection images of a target region recorded with an X-ray device. The projection images being recorded at different positions of an X-ray source along a scanning trajectory. The method includes defining an imaginary position of the X-ray source for each virtual X-ray image. For each virtual X-ray image and each pixel to be reconstructed in the X-ray image a virtual beam section, covering the target region, of the path between the imaginary position of the X-ray source and the pixel is defined. For each projection image, an integral is determined from the relationships between the forward projection and the filtered backprojection by re-parameterizing. A projection value of the virtual X-ray image from the integrals determined is combined.

23 Claims, 3 Drawing Sheets

METHOD FOR RECONSTRUCTING A RECONSTRUCTION DATA SET CONTAINING TWO-DIMENSIONAL VIRTUAL X-RAY IMAGES

CROSS-REFERENCE TO RELATED APPLICATION

This application claims the priority, under 35 U.S.C. §119, of German application DE 10 2011 087 337.6, filed Nov. 29, 2011; the prior application is herewith incorporated by reference in its entirety.

BACKGROUND OF THE INVENTION

Field of the Invention

The invention relates to a method for reconstructing a reconstruction data set containing two-dimensional virtual X-ray images from two-dimensional projection images of a target region recorded with an X-ray device. The projection images have been recorded at different positions of an X-ray generator along a scanning trajectory and, in particular, a fixed position of an X-ray detector in fan beam geometry.

In the field of mammography, according to the current state of the art, the standard investigation method for breast cancer is still plane projection mammography, which is inherently problematic with regard to three-dimensional information, since only an image in two-dimensional space is available. Anatomical noise, which occurs with imaged breast tissue structures having different densities, restricts the diagnostic value of the imaging process and makes it more difficult to generate correct positive or negative diagnoses. The cause of anatomical noise is that, with fluoroscopic imaging, the portions along a beam can no longer be distinguished, so that diagnostically relevant structures can become "covered" by other structures.

Therefore, particularly in relation to mammography, the imaging method of tomosynthesis was proposed which, in the context of mammography, is often also known as digital breast tomosynthesis (DBT). With this technique, various projection images are recorded along a scanning trajectory which extends over a limited angular range. In tomosynthesis, Tuy's condition is not met, which means that an exact reconstruction is not possible. Instead, in the context of tomosynthesis, slice images are reconstructed in three-dimensional space and frequently, "tomosynthesis planes" can be utilized to define the slices. The three-dimensional volume which is consequently reconstructed has severely anisotropic voxels, as a result of which the resolution within the slice is selected to be very high, whereas perpendicular to the slice plane, it is very low. However, particularly in the field of mammography, the technique of tomosynthesis allows overlaid breast tissue structures to be separated and thus to prevent possible hiding of lesions by background structures. However, this procedure makes the diagnosis of calcification clusters more difficult.

The usual route for evaluating tomosynthesis data is therefore the reconstruction of overlaid slices in the tomosynthesis planes, which are observed slice by slice by the evaluating person. In this process, the following problems arise.

Initially, important properties and structures of the tomosynthesis data set are often no longer visible from the individual slices, particularly the arrangement and distribution of calcification clusters within the breast.

It is also the case that many diagnosticians are trained for evaluating analog or digital two-dimensional mammography X-ray images (mammograms), which have an entirely different appearance and are perceived as slices of the digital breast tomography. It is therefore very difficult for these diagnosticians to evaluate slices from a tomosynthesis data set and it demands strenuous retraining and education, as well as the gathering of further experience.

For larger sized breasts, in particular, the problem also arises that the number of slices to be reconstructed rises so that the data transfer and the data display are slowed down and an increased storage capacity is needed in order to be able to display the reconstructed image data set with the slices.

In the prior art, a variety of techniques have been proposed in order to circumvent this problem, for example, the direct generation of slices through "maximum intensity projection" (MIP) or "average intensity projection" (AIP) rendering, multi-plane reconstruction (MPR) or the simple generation of a two-dimensional mammogram which is synthesized from the projection images and/or the reconstructed image data. Due to the density of the data and the inevitable consequential covering-over of internal structures, however, these techniques are not well suited to reproducing soft tissue data. Soft tissue with a high density can only be made visible if covering soft tissue of lower density is removed, for example, by an opacity transfer function. In this case, however, the information concerning the tissue of low density is lost, although such information provides important contextual information for the tissue of high density or other structural features of high density. This is undesirable for the viewing of information concerning soft tissues since the soft tissue contrast is the main information for the diagnosis of tissue changes.

It is conceivable to derive virtual X-ray images from a variety of directions by forward projection from the three-dimensional image data set containing the slices, although the quality of such virtual X-ray images is extremely low because, as already stated, the reconstructed voxels of the three-dimensional image data set are highly anisotropic, for example 0.085×0.085×1 mm, so that additional blurring of fine, clinically significant structures can occur, making useful evaluation difficult. Direct utilization of the projection images themselves is difficult in the field of tomosynthesis for several reasons. First, the projection images are often recorded with a fixed detector which therefore remains immobile throughout the duration of recording the projection images, so that only the X-ray source follows the scanning trajectory. As a result of this recording geometry, some features "slip", depending on which position of the X-ray source they were recorded at, making the evaluation more difficult. Second, in the native projection images, no information from the other projection images for improving the image quality is taken into account. The projection images are, in any case, mostly recorded with a low dose in order to minimize the radiation dose to the patient.

SUMMARY OF THE INVENTION

It is therefore an object of the invention to provide a possibility for deriving virtual X-ray images of higher quality from the two-dimensional projection images in a manner which is particularly simple and efficient from the computation standpoint.

In order to achieve the object, according to the invention, in a method of the aforementioned type, an imaginary position of the X-ray source for each virtual X-ray image is defined. For each virtual X-ray image and each pixel to be reconstructed in the X-ray image the following is performed.

a) defining a virtual beam section, covering the target region, of the path between the imaginary position of the X-ray source and the pixel, b) for each projection image, determining an integral, found from the relationships between the forward projection and the filtered back-projection by re-parameterizing, along the shadow thrown onto the surface of the actual position of the X-ray detector by the beam section starting from the actual position of the X-ray source during recording of the observed projection image, over the filtered projection values, and c) combining a projection value of the virtual X-ray image from the integrals determined in b).

The method according to the invention can ideally be carried out automatically on a computer device, preferably on an image computer of an X-ray device, in particular a tomosynthesis X-ray device.

According to the invention, it is therefore proposed that the step of anisotropic or even artifact-laden reconstruction of a three-dimensional image data set is circumvented, in order rather, by direct evaluation of the projection values of the projection images and integration along a path on the detector surface in the detector coordinate system to determine virtual X-ray images of a particular geometry which results from the selection of the pixel positions of the virtual X-ray image. The idea underlying the invention is explained in greater detail below making use of the theoretical derivation.

The spatial distribution of the X-ray attenuation coefficient of the object being recorded in the target region is described by the function $f(\underline{x})$ where $\underline{x}=(x, y, z)$, the coordinates being given in the general three-dimensional (world) coordinate system. It is assumed that a set of projection images in fan beam geometry has been recorded by a flat detector X-ray device. The projection values of the projection images are described by $g(i, u, v)$, where the discrete parameter $i=1 \ldots N$, represents the sequential number of the projection image, u and v are Cartesian coordinates which represent points in the detector plane on the X-ray detector itself. The position of the X-ray source during the recording of the projection image i is denoted as the vector $\underline{a}(i)$.

For each projection image i, an orthogonal system of vectors $\underline{e}_u(i)$, $\underline{e}_v(i)$ and $\underline{e}_w(i)$ is also introduced, such that $\underline{e}_u(i)$ and $\underline{e}_v(i)$ extend parallel to the detector plane (corresponding to the actual position of the detector when the projection image is recorded) and $\underline{e}_w(i)$ is arranged orthogonally on the detector plane and points in the direction of the X-ray source, that is, the position $\underline{a}(i)$. The first two vectors $\underline{e}_u(i)$ and $\underline{e}_v(i)$ define the axes along which the detector coordinates u and v are measured. These coordinates are further defined in that the origin thereof $(u, v)=(0,0)$ is situated at the orthogonal projection of the point $\underline{a}(i)$ on the detector plane. The distance between the X-ray source and the detector along this orthogonal projection is designated $D(i)$.

Without restricting the general applicability, it can be assumed, for example, that 25 projection images have been recorded, and therefore $N_i=25$, and the scanning trajectory can be selected such that the points $\underline{a}(i)$ are located equally spaced on a circular scan segment with an angular spread of 50°, which represents a typical tomosynthesis scanning trajectory. Furthermore, as is usual for tomosynthesis systems, the detector is static in space during recording of the projection images, which means that the detector is in a fixed position in space, in contrast to the X-ray beam. These parameters describe the overall geometry of a tomosynthesis X-ray device which can be used, for example, for mammography. In the case considered here, the set of projection images recorded can therefore be designated a tomosynthesis data set. Generalizing, the boundary conditions of a tomosynthesis recording for which the inventive method can be particularly advantageously used can therefore be described in that, as the scanning trajectory, a trajectory which does not meet Tuy's condition, and in particular a tomosynthesis scanning trajectory, is used. Tuy's condition describes the completeness of the projection data and therefore the fact of whether a complete precise reconstruction of a three-dimensional image data set is theoretically feasible. It is well known from the prior art.

It is an object of the present invention to calculate at least one virtual X-ray image by algorithmic combination of the data from all the recorded projection images $g(i, u, v)$. In a tomosynthesis data set, it can particularly advantageously be provided that a number of fixed scanning geometries in the region covered by the scanning trajectory is pre-selected and for each scanning geometry, including in particular an imaginary position of the X-ray source, a virtual X-ray image is determined. The virtual X-ray images can thus be calculated for a set of sequential projection angles in the order of magnitude of the maximum tomosynthesis angular range, particularly for an imaginary position of the X-ray source which corresponds to the real position on recording of the projection images. The restriction of the scanning geometries and, in particular, the projection angle for the virtual X-ray images is undertaken in order to minimize the blurring of structures and the occurrence of "out-off-plane-artifacts", such effects occurring as a result of the incomplete angular range of the tomosynthesis recording, that is, the non-fulfillment of Tuy's condition.

The determination of an exemplary virtual X-ray image will now be described in greater detail, wherein the source point, that is, the imaginary position of the X-ray source, of the virtual X-ray image is to be designated $\underline{a}_{virt}$ and this point, which will be considered in greater detail below, can be identical to a source point, that is, an actual position of the X-ray source during recording of a projection image, $\underline{a}(k)$. The alignment of the X-ray detector for the virtual X-ray image can be arbitrarily different from the alignment in the actual imaging geometry, since the X-ray signal, that is, the projection value, is ultimately defined by the crossing of a target region by a beam whose point of impact defines the position of the corresponding pixel, so that finally the selected position of this pixel exhaustively defines the position of the "virtual detector", as will become clearer below.

In a particularly advantageous embodiment of the present invention, it can be provided that, when the projection images are recorded with a static detector, virtual X-ray images are reconstructed so as to correspond to a recording of projection images in which the X-ray detector and the X-ray source have the same relative orientation for each projection image, and in particular are rotated together about the target region. In particular, therefore, it can be provided that the detector arrangement can be selected so that the detector surface is arranged orthogonally to the beam which passes from $\underline{a}_{virt}$ through the isocenter, and wherein the X-ray sensitive detector surface of the detector is to be centered about the beam.

In the case where tomosynthesis is used, which will now be discussed mainly by way of example, a reconstruction data set in the form of the virtual X-ray images therefore results, the data set acting as if actual X-ray images had been recorded with the X-ray source and the X-ray detector jointly rotating about the target region. As stated in the introductory part, X-ray images of this type are known to a diagnostician as two-dimensional mammograms, and are readily interpreted by the diagnostician. In principle, therefore, in the form of the reconstruction data set from virtual X-ray images, a type of three-dimensional, rotatable mammogram is produced which is an excellent additional aid for evaluating the recorded tomosynthesis data and this will now be discussed in greater detail. The present invention therefore makes it possible, in particular, to generate from projection images recorded with a static detector over a small angular interval, which are difficult to interpret, qualitatively improved and more easily interpreted mammograms having an assumed fixed spatial relationship between the X-ray source and the X-ray detector.

Reverting to the derivation of the inventive method, the pixel value of a virtual X-ray image is to be calculated at an arbitrary position (u, v). This projection value (pixel value) is denoted as P in the following and corresponds, as is known, to the following beam integral of the object density function:

$$P = \int_{t_1}^{t_2} f(\underline{a}_{virt} + t\underline{\alpha}) dt. \quad (1)$$

In this equation, $\underline{\alpha}$ is the unit vector along the beam, that is, the path between the imaginary position $\underline{a}_{virt}$ of the X-ray source and the pixel of the virtual X-ray image that is to be calculated and t is a parameter which denotes positions along this path. By means of the variables $t_1$ and $t_2$, the beam section is selected, and this is done such that $t_1$ and $t_2$ denote positions along the beam or the path, which lie outside the object under investigation and therefore the target region. It is assumed that, outside this beam section, no material is present and thus also no attenuation takes place, so that with the points situated on different sides of the target region, said region is completely included.

Direct evaluation of equation (1) is not possible since the function f is not known. Only the projection values g(i, u, v) of the projection images, and thus in particular of the tomosynthesis data set, are known.

A "naive" approach, not followed by the present invention, for determining the projection values of the virtual X-ray images would be initially to reconstruct an approximation to the object density f by using a standardized tomographic reconstruction route. The estimate determined could then be inserted into (1) for f in order to calculate P. The use of a reconstruction algorithm of the filtered backprojection (FBP) would lead to the equation $$\hat{f}(\underline{x}) = \sum_{i=1}^{N_i} g_F(i, u^*(\underline{x}), v^*(\underline{x})) \quad (2)$$

where $g_F$ describes the suitably filtered projection values and $u^*(\underline{x})$ and $v^*(\underline{x})$ describe the coordinates of the projection of the vector x onto the X-ray detector in the image i:

$$u^*(\underline{x}) = -D(i)\frac{(\underline{x} - \underline{a}(i)) \cdot \underline{e}_u(i)}{(\underline{x} - \underline{a}(i)) \cdot \underline{e}_w(i)} \quad (3)$$

$$v^*(\underline{x}) = -D(i)\frac{(\underline{x} - \underline{a}(i)) \cdot \underline{e}_v(i)}{(\underline{x} - \underline{a}(i)) \cdot \underline{e}_w(i)}. \quad (4)$$

The above-mentioned naive approach would therefore consist of two steps, specifically (i) reconstruction of a three-dimensional volume as per equation (2) and subsequently (ii) forward projection of the volume using equation (1). The disadvantage of this procedure is that a high-resolution three-dimensional image volume (that is a high-resolution three-dimensional image data set) has to be calculated and stored. This is extremely demanding, particularly with regard to storage capacity. If non-isotropic discretization of the image volume is taken into consideration, thereby saving memory, additional undesirable artifacts are generated.

The present invention therefore proposes a completely different approach which permits the calculation of the value P, avoiding the calculation of a three-dimensional intermediate image data set. The method aims at calculating P directly from the projection values of the projection images and can therefore be understood as a two-dimensional image processing approach.

The underlying concept of the method is to insert equation (2) into equation (1) and to swap the sequence of summing-up and integration to obtain $$P = \sum_{i=1}^{N_i} \int_{t_1}^{t_2} g_F(i, u^*(\underline{a}_{virt} + t\underline{\alpha}), v^*(\underline{a}_{virt} + t\underline{\alpha}))dt = \sum_{i=1}^{N_i} P_i. \quad (5)$$

The integral $P_i$ denotes the contribution of the projection image i. In the special case discussed above that $\underline{a}_{virt}=\underline{a}(i)$ for i=k, which opens up further possibilities, the following can be written $$P = wP_k + \sum_{i \neq k}^{N_i} P_i \quad (6)$$

where $P_k$ describes the corresponding contribution of the projection image k to the projection value P and a weighting factor w has been added which allows stronger weighting of the contribution of the projection image k as compared with all other contributions. If, in the above example, 25 projection images are assumed, a contribution exists in which the imaginary position of the X-ray source $\underline{a}_{virt}$ coincides with the actual position of the X-ray source $\underline{a}(i)$ for the projection image k and 24 other contributions with indices i, which differ from k.

If, now the changeover is made from integration over the parameter t, which denotes the position along the beam section, to an integration parameter s, which denotes the position along the shadow of the beam section thrown by $\underline{a}(i)$ onto the detector surface (the uv-plane), then the integrals $P_i$ can be calculated as $$P_i = (t_2 - t_1) \int_0^1 g_F(i, (1-s)u_1 + su_2, (1-s)v_1 + sv_2) ds \quad (7a)$$

where, for the special case, $\underline{a}_{virt}=\underline{a}(k)$ for the term $$P_k = mg_F(k, u_1, v_1) \quad (7b)$$

according to which the shadow for this special case collapses to a point. In the equations (7a) and (7b), the following are produced $$u_{1/2} = u^*(\underline{a}_{virt} + t_{1/2}\underline{\alpha})$$

and $$v_{1/2} = v^*(\underline{a}_{virt} + t_{1/2}\underline{\alpha}) \quad (7c)$$

where the scaling parameter m in (7b) is selected so that the norm of the contribution $P_k$ is identical to the mean value of the norm of the contributions $P_i$ for i≠k.

Equation (7a) which describes the integrals in general therefore results, in conjunction with (7c), apart from a combination of the relationships from (1) and (2), from a change in the integration so that, rather than along the beam, integration can be carried out in three-dimensional space in the detector plane u, v. The integration of "voxel values" along the beam section is thus transformed into integration of filtered "pixel values" along the shadow of the beam section on the X-ray detector. Each projection image i thus supplies an additive contribution $P_i$ to the unknown P. In the event that the shadow of the beam section corresponds to a single point (in the example, at i=k), the contribution can be determined using the alternative equation (7b).

As already shown, in the derivation described here, the projection values P of the virtual X-ray image are found as the sum of the individual contributions, so that it can be provided according to the invention that the integrals for determining the projection value P, in particular weighted, are at least partially summed up. As previously described, it can therein be provided, in particular, that for a projection image, on coincidence of the imagined position with the actual position of the X-ray source for the projection image in question, the integral $P_k$ to be performed over a point is more strongly weighted than the integrals $P_i$ of the remaining projection images.

It should be noted at this point that, for stronger weighting of the contribution of the projection image coinciding in the position of the X-ray source with the imaginary position, multiplicative and/or exponential weighting can be used, meaning that equation (6) could then be transformed into $$P = w \cdot \text{sign}(P_k)|P_k|^N + \sum_{i \neq k}^{N_i} P_i \quad (8)$$

in which an additional exponential weighting parameter N has been introduced which enables modification of the dynamics of the first term of the sum. The weighting parameter N can, in particular, take values between 1 and 2. The use of the weighting parameter N can also be regarded as a type of "gamma correction".

However, it should be emphasized again here that weightings can naturally also be undertaken in respect of other contributions $P_i$ based on different criteria for increasing the image quality of the virtual X-ray images. Given an essentially linear combination of the integrals to the projection values of the virtual X-ray image, there is a large number of degrees of freedom in order to improve the image quality in respect of different optimization targets by controlling the contributions or the weighting thereof.

Particularly advantageously however, it is possible in the context of the present invention, to replace the linear combination in (6) heuristically by non-linear combination strategies, which means that it can be provided that the integrals for determining the projection value P are at least partially non-linearly combined, particularly by using a cluster operator and/or a maximum operator and/or an operator which excludes statistical outliers. Therefore, operators such as the k-mean value operator, the maximum operator and the like can be used, a particular example being restricted to the contributions $P_i$, for which $\underline{a}(i) \neq \underline{a}_{virt}$. In this way, statistically severely deviating values (outliers) which arise, for example, from measuring errors, particularly noise or the like, can be removed from consideration, so that qualitatively high value virtual X-ray images are obtained and, in particular, also the number of artifacts in the virtual X-ray images is reduced.

It can therefore be provided, for example, that a non-linear combination, for example, a selection of the maximum, is made in relation to the contributions $P_i$ for which i≠k, and then a possibly weighted sum is formed with the contribution $P_k$ and the like.

For the actual algorithmic calculation of the integrals, according to the invention, a plurality of alternatives is conceivable. It is thus possible in a less preferable exemplary embodiment that the integral is determined as a Riemann sum, the step size of which essentially corresponds to the extent of a pixel of the X-ray detector. By this means alone, a marked improvement can be achieved with regard to efficiency and making use of the degrees of freedom described and in respect of image quality, in particular since calculation of a three-dimensional image data set is no longer necessary. Nevertheless $N_i$ (or with $\underline{a}_{virt} = a(k)\_N_i - 1$) numerical integrations according to equation (7a) are necessary in order to determine a single projection value P of a virtual X-ray image. Every such numerical integration along the shadow of the beam section on the detector can be demanding from the standpoint of the computation effort required, since the shadow can cover several hundreds or thousands of pixels.

In order to solve this problem, with another alternative possibility for calculating the integrals, it is proposed that to determine the integrals in step b) for each projection image and each imaginary position of the X-ray source, firstly, an original function projection image is initially determined in that the projection point of the imaginary position of the X-ray source is determined starting from the actual position of the X-ray source on recording the projection image in the plane of the actual X-ray detector, a fan of straight lines crossing the detector surface and originating from the projection point is determined and the filtered projection values of the projection image being observed are integrated for positions on the detector surface along the length of the straight lines to obtain the values of the original function projection image. The determination of the integrals in step b) is carried out by taking the difference of the values of the original function projection image at the edges of the shadow. In a suitable embodiment, it can be provided that the integration for determining the original function projection images is carried out in a computation coordinate system defined by an angle and a distance from the projection point, in that rebinning of the projection images to the computation coordinate system before the integration and rebinning of the original function projection image to the Cartesian detector coordinate system are carried out following integration.

The underlying concept of this extremely computationally efficient solution rests upon the fundamental theorem according to which the determined integral of a function b is equivalent to the difference between two values of a function B, where B is the original function of b. In this way, the numerical integration onto a projection image obtained by summing up the values of several hundreds or thousands of pixels can be replaced by a simple difference of two values of an original function projection image.

The idea behind this is that as soon as the original function projection image has been calculated for an index i, this can be used in order to avoid numerical integration not only during the calculation of the value P in relation to the actually observed beam section, but also for all other beam sections that have been determined starting from the imagined position $\underline{a}_{virt}$. Geometrically, this can be explained as follows. The shadow of each possible beam section originating from the point $\underline{a}_{virt}$ matches the segment of a straight line on the detector which crosses the projection point ($u_{virt}$, $v_{virt}$), that is, the projection of $\underline{a}_{virt}$ originating from $\underline{a}(i)$ on the detector plane. The shadow of all possible beam sections or paths therefore forms a fan of straight lines on the detector, wherein the integration is needed only along the radial direction of this fan. Therefore, instead of determining the contributions through numerical integration according to equation (7a), given a known original function projection image, the difference between two values of the original function projection image can simply be taken, which can be realized on a computer device significantly more efficiently.

The original function projection image can be calculated on the basis of the below defined steps.

Forward rebinning: projection values of the projection image are extrapolated along the fan of straight lines which pass through the point ($u_{virt}$, $v_{virt}$) corresponding to the fan beam projection of $\underline{a}_{virt}$ onto the detector plane. The result of the forward rebinning is a data structure which is formed in a μ, s coordinate system, where the angle μ is used to define a particular straight line within the fan of straight lines and where s is used to define positions along this straight line.

Integration: the re-sorted projection values are integrated in relation to s along each straight line.

Reverse rebinning: the integrated projection values of the original function projection image are interpolated back into the original Cartesian coordinate system u, v on the detector.

Expressed in the form of equations, this means that the projection values $G_F(i, u, v)$ of the original function projection image are obtained from the filtered projection values $g_F(i, u, v)$ of the projection image as $$G_F(i, u, v) = \int_0^{s^*} g_F\left(i, u_{virt} + s\frac{u - u_{virt}}{s^*}, v_{virt} + s\frac{v - v_{virt}}{s^*}\right) ds \quad (9)$$

where $$s^* = \sqrt{(u - u_{virt})^2 + (v - v_{virt})^2} \quad (10)$$

defines the distance between the points (u, v) and ($u_{virt}$, $v_{virt}$). Equation (7a) is thus evaluated as $$P_i = \frac{t_2 - t_1}{\sqrt{(u_2 - u_1)^2 + (v_2 - v_1)^2}} (G_F(i, u_2, v_2) - G_F(i, u_1, v_1)). \quad (11)$$

Equation (11) contains no further numerical integration.

The two alternatives set out here—calculation by a Riemann sum and calculation of an original function projection image—can be transformed into suitable algorithms that can be used on a computer device, in particular the image computer of an X-ray device, examples of which will be given in the following.

It should be noted at this point that it can suitably be provided that the projection data is filtered using a filter usable for filtered back projection, in particular a ramp filter and/or a cosine weighting and/or a redundancy compensation weighting.

Thus, in the two alternative variants, the projection values of the projection images must first be filtered in order to determine the filtered projection values $g_F$. This still corresponds to the usual step in an algorithm of the filtered back projection, wherein ramp filtering, cosine weighting, global scaling and redundancy compensation weighting are undertaken.

For each desired virtual X-ray image, in the case of use of a Riemann sum, a loop is formulated covering all the pixels of the current virtual X-ray image and one pixel is observed at each time point. The projection value P (grayscale value) of such an observed pixel is calculated in that, by a loop, all the filtered projection images i=1 . . . $N_i$ are observed and the steps a) and b) are initially realized, for example if $\underline{a}_{virt}=\underline{a}(k)$, by means of the steps:

if i≠k: determining the shadow of the beam region of the path on the detector (in the uv-plane), summing up the values of $g_F$ along the shadow in order to determine the value $P_i$ or an at least partial replacement of the summation by a non-linear operation. In this regard, it is also possible to deviate from the simple summation in order to use additional degrees of freedom to improve the image quality, and if i=k: determining the point (u, v) at which the path between $\underline{a}_{virt}$ and the pixel intersects the detector plane and interpolation of the value of $G_F$ at this point, as well as performing the normalization, factor m.

Finally, the $N_i$−1 contributions $P_i$ and the contribution $P_k$, which can, in particular, be weighted with the scalar weighting factor w, are linearly combined in order to obtain the desired projection value P. It should be noted once again that non-linear combination strategies are, of course, also possible, as described in detail above.

In the case of an algorithm which uses the original function projection image, following the defining of the geometric parameters of the virtual X-ray image and determining the original function projection values $G_F$ in the loop for determining the $P_i$, $P_k$, the procedure is as follows:

if i≠k: determining the contributions $P_i$ as per equation (11), if i=k: determining the contribution $P_k$ as per equation (7b).

Here too, the projection value P of the virtual X-ray image can now be determined by linear and/or non-linear combination, particularly on the basis of equation (6) or (8).

The inventive approach especially permits, for example, in general terms, originally recorded projection images to be reconstructed as virtual X-ray images of the same scanning geometry with a higher degree of detail, an improved signal-to-noise ratio and an improved contrast-to-noise ratio. This has its basis in the fact that each virtual X-ray image is reconstructed taking account of the information from all the recorded projection images.

Specifically in connection with tomosynthesis, there are further clear advantages, since, for example, as previously stated, the "look and feel" of two-dimensional directly recorded mammograms can be obtained, and this enables simpler evaluation and diagnosis. Three-dimensional information is obtained once it has been possible for virtual X-ray images to be reconstructed with different projection directions and/or scanning geometries. This permits the "removal" or "displacement" of masking by observing virtual X-ray images in which a different virtual scanning geometry is present.

In this context, the inventive method also permits, particularly in the field of mammography, all tissue densities and calcification structures to be reconstructed at the same time. The number of images which must be looked through, transferred and stored is limited to the number of discrete observation angles of the virtual X-ray images, regardless of the thickness of the breast.

It is particularly advantageous if the previously mentioned three-dimensional rotatable mammogram is reconstructed, in that finally virtual X-ray images are reconstructed at different imaginary positions of the X-ray source along the actual scanning trajectory as if the X-ray detector were also rotated.

The virtual X-ray images can be reconstructed directly from the recorded projection images so that the problem of forward projection of anisotropic voxels from a three-dimensional image data set, particularly a DBT image data set, is avoided.

As stated above, in the context of the present invention, a plurality of degrees of freedom is available, wherein depending on the type of recombination of the individual contributions, in particular the integrals, it is possible for the final image quality of the virtual X-ray images to be influenced with regard to particular quality aims. Put another way, the inventive method is distinguished by a plurality of reconstruction parameters, the variation of which influences the image properties and thus also the quality with regard to particular reconstruction aims. Such reconstruction parameters are not only geometric parameters, containing the imaginary position of the X-ray source for the various virtual X-ray images, but also algorithmic parameters, for example, weighting parameters, filter parameters and parameters defining the manner of combination of the integrals.

These reconstruction parameters can be adapted interactively, which means that it can be provided that reconstruction parameters used during reconstruction of the virtual X-ray images, particularly geometric parameters and/or algorithmic parameters, can be interactively adjusted by the user. The reconstruction parameters can be adjusted, for example, by a user such that clinically relevant features and structures are set to a high contrast. In the case of mammography, structures of this type are, for example, microcalcifications, agglomerations and spiculations of masses, Cooper's ligaments and the like.

According to the invention, it is preferable, however, if reconstruction parameters used during the reconstruction of the virtual X-ray images, in particular geometric parameters and/or algorithmic parameters, can be determined at least partially automatically, in particular dependent upon user input. In this exemplary embodiment, the reconstruction parameters are at least partially automatically adapted so that, for example, the contrast and/or the edge sharpness is maximized for at least one reconstructed clinical feature or at least one reconstructed clinical structure, for example microcalcifications and the like. Thus, in the concrete exemplary embodiment, it can suitably be provided that before the reconstruction of the virtual X-ray images by a three-dimensional reconstruction method, in particular filtered back projection and/or iterative reconstruction, a three-dimensional image data set is reconstructed from the projection images and is displayed, wherein following marking of at least one region of interest and/or one structure of interest by a user, the reconstruction parameters for improving at least one image property for the marked region and/or the marked structure, in particular maximizing the contrast, are automatically selected. A reference construction method, for example, filtered back projection or an iterative reconstruction with a large number of iterations in order to achieve the representation of all clinically significant features is therefore used in order to reconstruct a three-dimensional image data set in advance. A user can now manually mark, possibly by supported segmentation, clinically significant features in the form of a region of interest and/or a structure of interest, in the case of imaged slices, for example, in each imaged slice. The reconstruction parameters, in particular the parameters of the algorithm, are then selected so that, for example, the contrast of the marked clinical features in the virtual X-ray images is maximized. For this purpose, for example, optimization methods or the like can be used. An interactive concluding step can be used in order to set reconstruction parameters based on the preferences of the user.

The resulting reconstruction data set of virtual X-ray images can be stored, for example, as a set of files in a particular image file format, in particular in DICOM format, in jpg format, in tiff format, in bmp format or in other image file formats.

At the X-ray device itself and/or at a workstation computer to which the virtual X-ray images are transferred, the images can be displayed, particularly sequentially, and particularly advantageously as previously stated, as a three-dimensional rotatable mammogram, wherein already existing tools for observing typical reconstruction data sets can be used, in particular application programs and tools which are used for displaying volumes consisting of a plurality of slices. In the case of a three-dimensional rotatable mammogram, the use of the applications and tools for slice imaging generate the illusion of a rotating mammogram rather than a movement through the slices of a normal three-dimensional volume.

Within the framework of the present invention, it can also be provided that, in addition to the virtual X-ray images, a typical three-dimensional image data set is reconstructed, wherein a three-dimensional reconstruction method, in the particular filtered back projection and/or iterative reconstruction, can be used. For example, in the case of tomosynthesis, a three-dimensional volume can still be reconstructed from the projection images having the aforementioned anisotropic voxels and can be conceived and represented as slices defined on the basis of tomosynthesis planes. Then, on evaluation, it can particularly advantageously be provided that the virtual X-ray images are displayed together with the three-dimensional image data set reconstructed by the three-dimensional reconstruction method, in particular filtered back projection and/or iterative reconstruction, from the projection images. For example, therefore, a representation can be generated wherein the virtual X-ray images are displayed together with a representation, for example a slice, of the three-dimensional image data set.

It is, however, possible in this regard, that when observing image data of a data set, by an operator action, corresponding image data of the other data set is displayed in an enhancing window, in particular a lens window. A user can thus, for example, sequentially examine slices of a three-dimensional image data set, the virtual X-ray images being displayed in an enhancing window on execution of an operator action displaying the window, for example actuating a mouse button. For example, a lens window (enlarging window) can be used as an enhancing window. However, the converse case is also preferably possible, that the virtual X-ray images are sequentially observed and slices or views of the three-dimensional image data set are displayed only on request, in an enhancing window.

Naturally, in an evaluating environment of this type, the widest variety of operating possibilities can be provided for a user, for example operating possibilities for scrolling through the slices of a three-dimensional image data set or displaying and/or selecting sequential virtual X-ray images, displaying the original projection images, for adjusting window sizes, in particular the size of the enhancing window and the like. Operating possibilities of this type can be assigned to particular operating devices so that, for example, the mouse position on a screen can be evaluated, in particular the position of the mouse within or outside an enhancing window, various combinations of three different mouse buttons can be requested, the direction of the mouse movement on the screen can be evaluated (for example, the allocation of a vertical motion for moving through the slices and the allocation of a horizontal movement to a rotation of the basic volume) and the like. Scroll bars at the edges of the screen or the window can also control a movement within slices or X-ray images or control a change between slices and X-ray images.

The method according to the invention can be realized by any computer device on which the data of the projection images are present or which has suitable access thereto. It is preferable, however, if the image computer of an X-ray device is configured to carry out the method according to the invention, wherein in general hardware and software components can be provided for realizing the algorithms. The X-ray device with which the projection images are recorded can be, in particular, a tomosynthesis X-ray device, wherein a spatially fixed X-ray detector is provided. The X-ray source is movable relative to the fixed X-ray detector, for example, along a scanning trajectory which can cover a projection angular range of between 40° and 60°. As described above, reconstruction of data sets, in particular a three-dimensional image data set and/or the reconstruction data set at virtual X-ray images, can already be carried out in the image computer of an X-ray device of this type.

For an intuitive understanding of the present invention, it should also be noted that a reconstructed virtual X-ray image can be imagined to be a combination of two images, similarly to the terms in (6) or (8). One of these imaginary images originates from the single projection at k, whereas the other image is derived from the remaining $N_i-1$ projections. These two images have different properties, so that, for example, the first image with the contributions of the projection image k, has a higher noise level, but is not corrupted due to out-of-plane artifacts. The first image contains a plurality of structural high frequency information and thus also shows very small structures, for example, microcalcifications, so that the structures remain in the virtual X-ray image. If the virtual orientation of the X-ray detector deviates from the actual orientation of the X-ray detector with the index k, then the first image contribution derived therefrom originates by a rebinning/reformatting process of the filtered projection image (see equation (7b)).

The second image or the second image portion has a lower noise level since it contains the information from a relatively large number of images, in the example with a total of 25 projection images, from 24 projection images. It is influenced, to a certain extent, by out-of-plane artifacts. This image contributes, finally, to obtaining low contrast structures and soft tissue structures in the final virtual projection image.

Other features which are considered as characteristic for the invention are set forth in the appended claims.

Although the invention is illustrated and described herein as embodied in a method for reconstructing a reconstruction data set containing two-dimensional virtual X-ray images, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
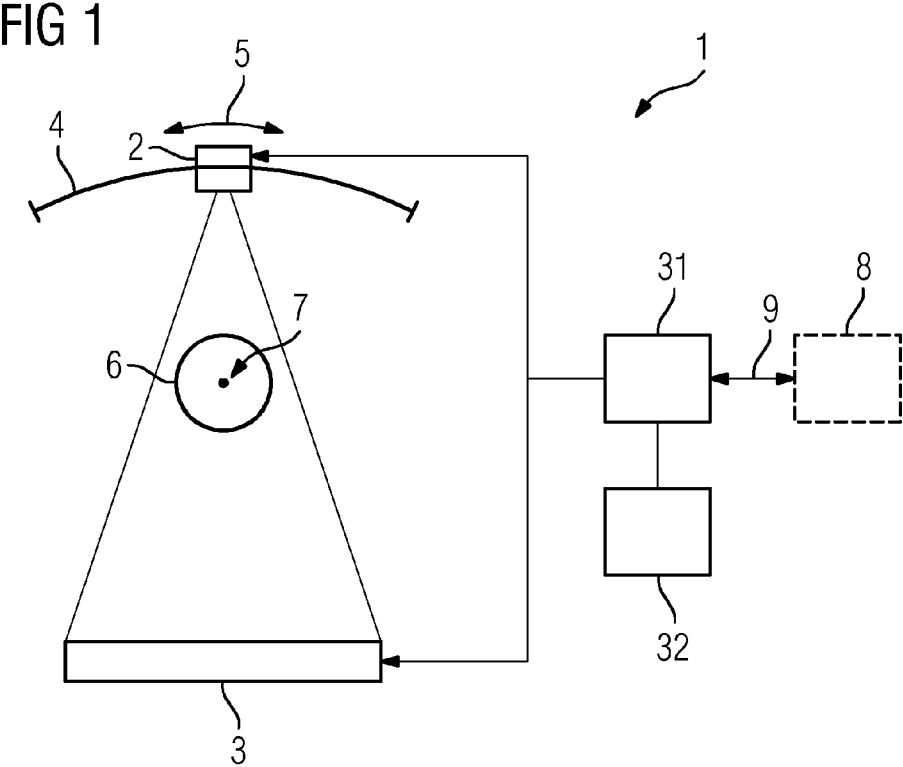
FIG. 1 is a illustration showing the principle of a tomosynthesis X-ray device.

Referring now to the figures of the drawing in detail and first, particularly, to FIG. 1 thereof, there is shown a sketch illustrating the principle of a tomosynthesis X-ray device 1, of which only the components essential to the present invention are shown. An X-ray detector 3 locally fixed in relation to an X-ray source 2 is configured to receive X-ray radiation for recording projection images. It is clear from the drawing that a guideway 4 is provided, in which the X-ray source 2 can be pivoted, as shown by the arrow 5, to various positions for recording projection images. A particular angular range is covered, in the present case a maximum of 60°, so that projection images recorded with the tomosynthesis X-ray device 1 clearly do not meet Tuy's condition for complete, theoretically exact reconstruction of a three-dimensional image data set.

At different positions of the X-ray source 2, images of a target region 6, in this case a mammary gland, which can, for example, be placed in an imaginary isocenter 7 of the X-ray device 1, can be generated in the fan beam geometry.

In order to control the components of the X-ray device 1, a control device 31 is provided, to which an image computer 32, which can be configured for carrying out the method according to the invention, is also connected. Naturally, however, the method according to the invention can also be carried out by external computer devices 8, which are connected to the X-ray device 1 via a communication connection 9.

It is therefore possible, by use of the X-ray device 1, to record projection images of the target region 6 or an object, in this case a breast, for example, in the present case 25 projection images at different positions of the X-ray source 2 along the circular arc-shaped scanning trajectory, which can cover an angular region of, for example, 50°. It should be noted that the relative position of the X-ray source 2 and of the X-ray detector 3, which is configured here as a flat detector, is not the same for each of the projection images due to the locally fixed X-ray detector 3 so that, for example, the same feature of the target region 6 is imaged at different positions in the projection images which are recorded at different positions of the X-ray source 2.

In the exemplary embodiments described here of the method according to the invention, two-dimensional virtual X-ray images are to be determined so as to reproduce the target region as if the X-ray images had been recorded with joint rotation of the X-ray source 2 and the X-ray detector 3 about the isocenter 7. Each of the virtual X-ray images finally represents a two-dimensional mammogram, so that the overall reconstruction data set consists of several virtual X-ray images, the imaginary (virtual) position of the X-ray source 2 in the present exemplary embodiment always being so selected as to correspond to an actual position of the X-ray source 2 during recording of a projection image. The virtual X-ray images can thus be regarded as a type of three-dimensional rotatable mammogram.

Figure 2:
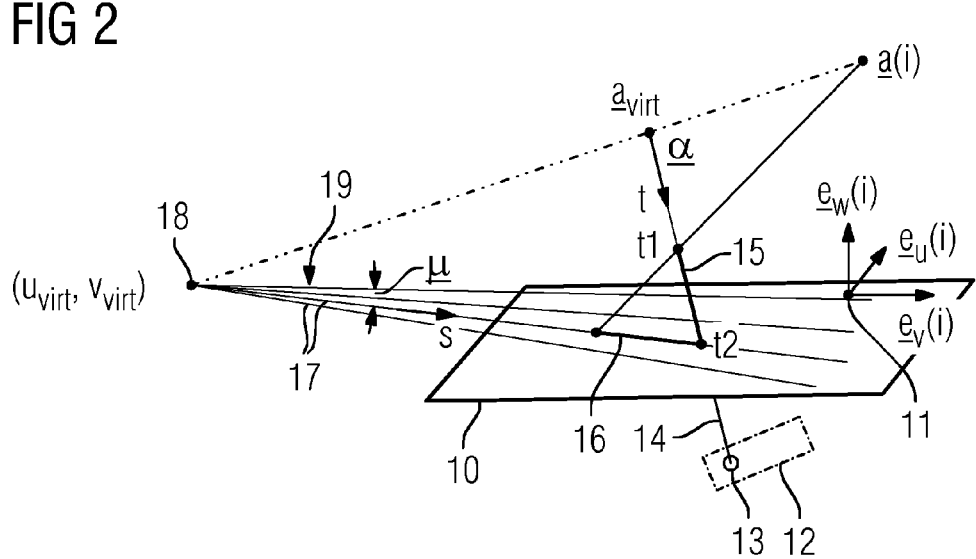
FIG. 2 is an illustration of geometry underlying a determination of an integral $P_i$.

FIG. 2 illustrates, in the form of a sketch, the principle of the geometry as already set out in the general part of the description.

It is again assumed that a set of projection images, having projection values g(i, u, v) of the target region 6 has been recorded. i has values from 1 to $N_i$ (for example, 25) and corresponds to a sequential number of the projection image, which denotes the particular scanning geometry which, in this case is the position $\underline{a}(i)$ of the X-ray source 2 during recording of the projection image i. u and v are the Cartesian coordinates which identify points on a detector surface 10 of the actual detector 3, which in this case is locally fixed. u and v are ultimately defined by an orthogonal coordinate system defined for each projection i and shown in FIG. 2 for one projection i, the coordinate system being defined by the unit vectors $\underline{e}_u(i)$, $\underline{e}_v(i)$ and $\underline{e}_w(i)$, the coordinates being defined such that the origin thereof (u, v)=(0,0) corresponds to the orthogonal projection 11 of a(i) onto the detector plane.

As previously mentioned, the aim of the inventive method is to determine projection values of virtual X-ray images denoted as P (see equation (1)) which are assigned to the X-ray source position $\underline{a}_{virt}$ (see also FIG. 2). As set out above, an imaginary detector position, indicated at 12, is assumed, the virtual X-ray detector being assumed here to be arranged orthogonally to the beam which extends from $\underline{a}_{virt}$ through the isocenter 7, the X-ray sensitive region of the detector being centered about this beam. If, for a pixel 13 on the imaginary X-ray detector, a projection value P of the virtual X-ray image is now to be determined, the path from the imaginary position $\underline{a}_{virt}$ to the pixel 13 must be considered, the path being identified in FIG. 2 with the reference character 14. Attenuation contributions from the object density arise only in the target region 6, so that it is sufficient, for the integral in (1), to consider a beam section 15 which, in the present case, is defined on the basis of the parameter t by the limits $t_1$ and $t_2$. Herein, multiples of the unit vector $\underline{\alpha}$ along the path 14 are denoted by t.

The path 14 can also be denoted as the current "ray of interest".

It should be noted at this point that the position of relevance for the pixel 13 on the detector surface 10 of the actual X-ray detector 3 corresponds to the point of intersection (u, v) with the detector surface 10.

In the present example, it is assumed that $\underline{a}_{virt}=\underline{a}(k)$ applies, so that ultimately, depending on the desired weighting, formulae (6) and (8) can be written by inserting equation (2) in equation (1) and swapping summation and integration.

FIG. 2 also clearly shows the relation on changing the integration variables from t to s (see equation (7a)). The integration of the "voxel values" along the beam section 15 is rewritten as an integration of filtered "pixel values" along a shadow 16 of the beam section 15 on the detector surface 10. The shadow 16 is produced by shading of the beam section 15 starting from the actual position $\underline{a}(i)$ of the X-ray source 2 at the time point of recording the projection image i.

From the relations shown in FIG. 2, it is readily seen that, in the case where i=k, only a point on the detector surface 10 remains as the shading, and hence formula (7b).

It is also very apparent from FIG. 2 how, ultimately, the relationship in formula (9) is produced. It can be stated that, for all the beams or paths 14 of interest which pass through $\underline{a}_{virt}$, the associated shadows 16 are part of a straight line 17 which passes through the projection point 18 from $\underline{a}_{virt}$ to the detector plane. The projection point 18 has the coordinates $(u_{virt}, v_{virt})$. The shadow of all possible paths 14 therefore forms a fan 19 of straight lines 17 in the detector plane, wherein the integration (see direction s) is needed only along the radial direction within the fan 19.

Therefore, as previously described in the general part of the description, rebinning to the coordinate system formed by the angle μ and s can be carried out, wherein an original function projection image $G_F$ can be determined.

Two exemplary embodiments of the method according to the invention will now be described in greater detail, wherein, in one case, the integrals in equation (7a) are calculated with a Riemann sum and, in the other case, an original function projection image is determined and is used as per equation (11).

Figure 3:
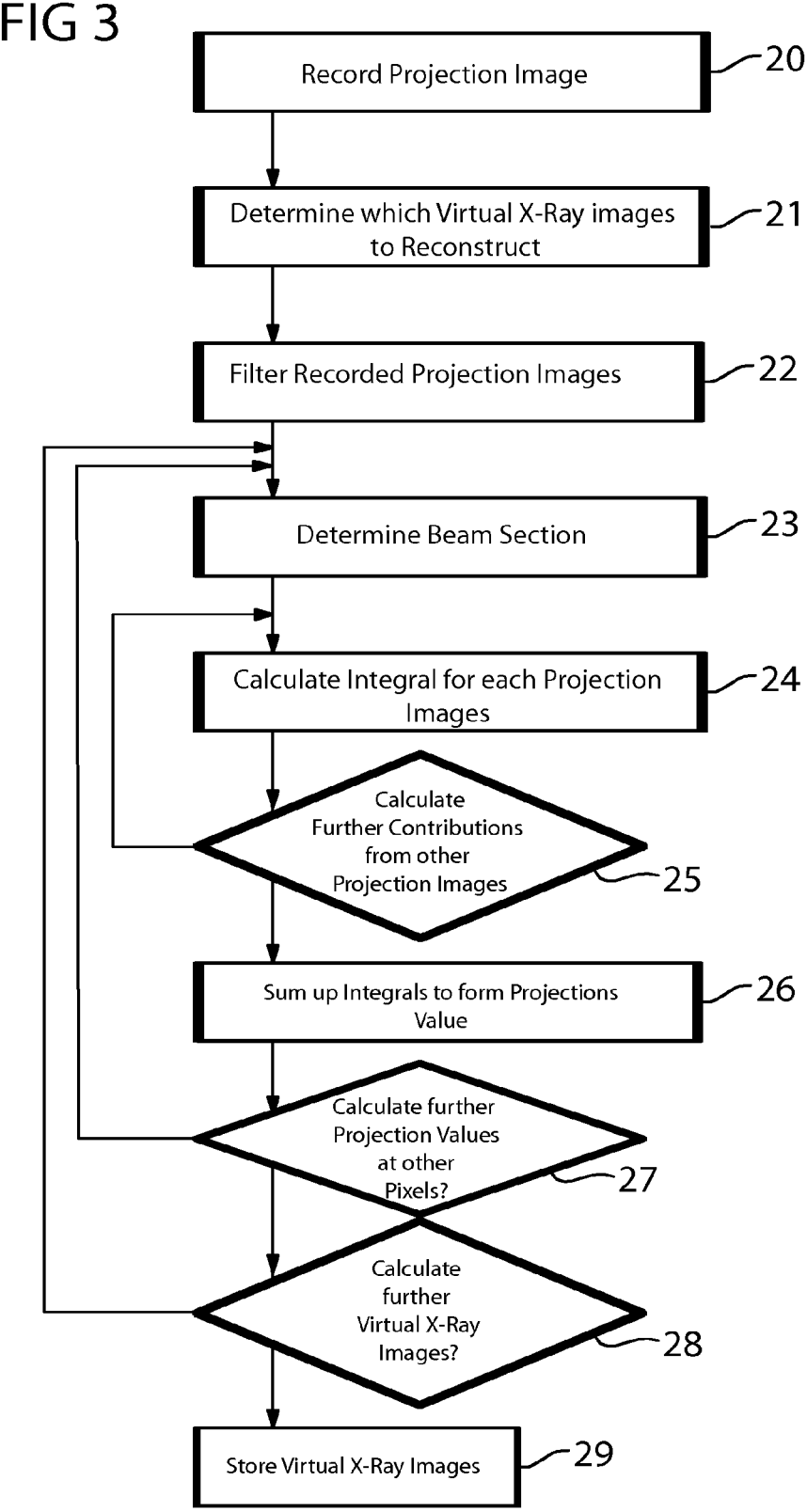
FIG. 3 is a flow diagram of a method according to the invention in a first exemplary embodiment.

FIG. 3 shows a flow diagram of a first exemplary embodiment of the inventive method. In step 20, firstly, as described above, the projection images are recorded. The images thus form a tomosynthesis data set.

In step 21, it is determined which virtual X-ray images are to be reconstructed. In the present case, for each position of the X-ray source 2, during recording of a projection image, an imaginary position $\underline{a}_{virt}$ of the X-ray source 2 is defined for a virtual X-ray image as the same position, that is, for each projection image, a virtual X-ray image is calculated at the same source position wherein the X-ray detector 3 is imagined also to be moved, as described above. Naturally, other possibilities are also conceivable for stipulating which virtual X-ray images are to be reconstructed, for example, by a corresponding user input of the geometric parameters.

In step 22, the recorded projection images are then treated with a filter, in the present case a ramp filter also used in the context of the filtered back projection. Naturally, other filters used with typical algorithms for filtered back projection are also usable.

The following steps are now carried out for each desired virtual projection image. Firstly a pixel is selected for which a projection value P is to be determined. In step 23, the beam section 15 is determined so as to cross the entire target region 6.

A further loop which runs through all the recorded projection images i then begins. For each of the projection images, the corresponding integral $P_i$ is then calculated in step 24, after which if the actual position and the imaginary position of the X-ray source 2 coincide, formula (7b) is used, otherwise formula (7a). A Riemann sum is used, the step size of which corresponds to the extent of a pixel on the detector 3. However, it should be noted that in this case, non-linear combination possibilities are conceivable. If a Riemann sum is used, then ultimately, following the determination of the shadow 16 in step 24, summing-up of the values of $g_F$ along the shadow 16 is carried out in order to determine the contribution $P_i$ for the event that the shadow 16 does not fall on a point, as described above.

In step 25 it is tested whether further contributions $P_i$ from other projection images are to be calculated. Once all the contributions $P_i$ have been calculated, the integrals $P_i$ are summed up in step 26 to form the projection value P, for which, for example, formulae (6) or (8) can be used. It should also be noted here, particularly in relation to the projection images not corresponding to the virtual X-ray image in the position of the X-ray source, however, that a non-linear combination is conceivable, thus avoiding, in particular, statistical outliers and the like also being recorded.

In step 27, it is tested whether further projection values are to be calculated at other pixels. If this is not the case, the calculations relating to the current virtual X-ray image are concluded. In step 28 it is tested whether further virtual X-ray images are to be calculated. If all the virtual X-ray images have been calculated, in step 29 these are stored, preferably as individual images in a particular image file format and/or transferred to a workstation computer.

Figure 4:
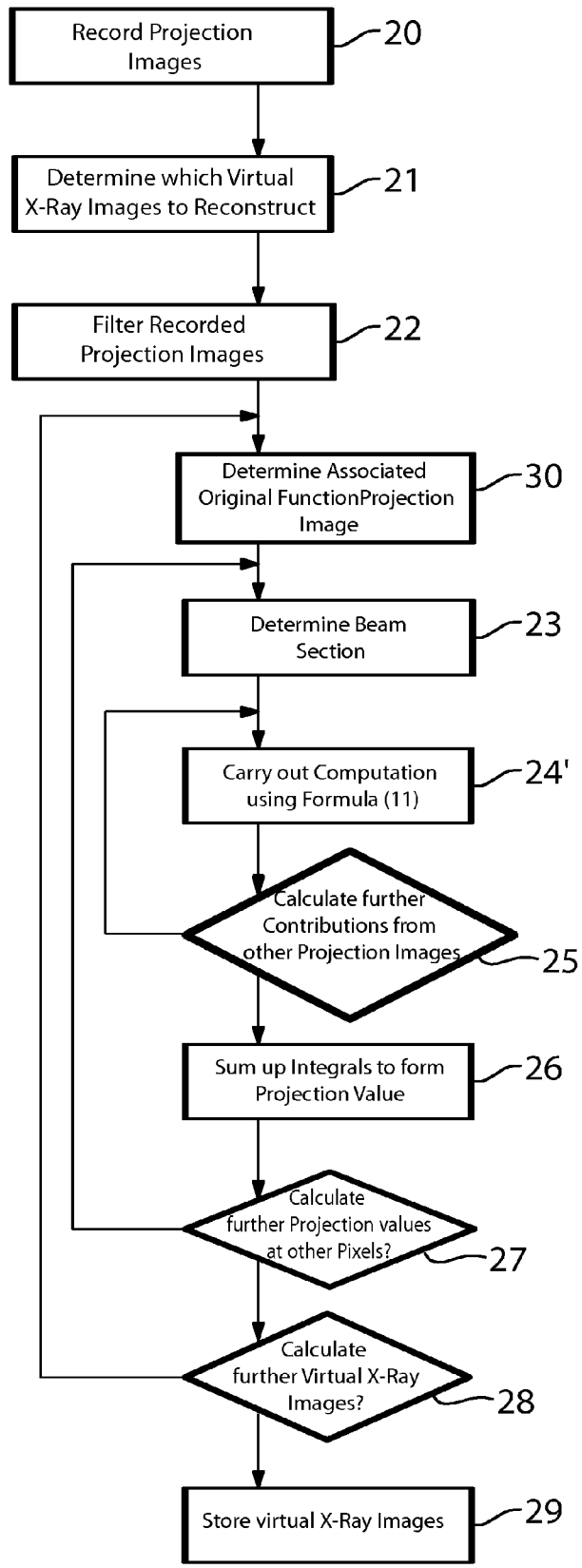
FIG. 4 is a flow diagram of the method according to the invention in a second exemplary embodiment.

FIG. 4 shows the flow diagram of a further preferred exemplary embodiment of the inventive method wherein the steps 20-22, 23, 25-29 correspond to those of the exemplary embodiment of FIG. 3 and thus will not be discussed in detail. The exemplary embodiment according to FIG. 4 initially differs from the exemplary embodiment according to FIG. 3 in that as soon as the currently observed point $\underline{a}_{virt}$ is known, in step 30, using formula (9), an associated original function projection image with original function projection values $G_F(i, u, v)$ is determined and stored for each projection image i. For this purpose, for each projection image in step 30, forward rebinning to the coordinate system defined with the angle μ and the radial parameter s (see also FIG. 2) is carried out. Thereafter, integration is carried out with respect to s for the values of the straight lines 17 of the fan 19. Then, reverse rebinning to the Cartesian coordinate system with the coordinates u, v is carried out.

The original function projection images stored in this way are used in the modified step 24' since here no further integration needs to be carried out, but rather the computation is carried out using formula (11), so that only a difference has to be evaluated at the edge points of the shadow 16.

A more efficient calculation is possible in this way.

It should be noted at this point that, apart from the previously mentioned selection of the geometric parameters, a user can also make at least a partial, or complete, selection of the algorithmic parameters as reconstruction parameters. Algorithmic parameters are, for example, the weighting parameters w and N from equation (8) and parameters which define how the integrals $P_i$ are to be combined to form the projection value P in step 26, such as for example, whether non-linear operations are to be used.

In this regard, in the exemplary embodiments of the inventive method described here, it is provided that firstly, as usual, a three-dimensional image data set is reconstructed from the projection images and comprises slices defined by tomosynthesis planes—shown as anisotropic voxels. Said slices are displayed to a user who can mark regions and/or structures of interest. This can be supported by automatic segmentation. At least a part of the algorithmic parameters are now automatically adapted, for example, in the context of a optimization process or based on rules or adaptation algorithms so that the regions and/or structures of interest are particularly readily recognizable in the virtual X-ray images. For example, the algorithmic parameters can be selected so that the contrast of the selected clinical features in the slices is maximized. Naturally, at the same time, the possibility can also exist for a user to adapt reconstruction parameters as desired.

The three-dimensional image data set mentioned above, which can be determined by means of filtered back projection and/or iterative reconstruction, can also be displayed with the virtual X-ray images, for example, in that the virtual X-ray images and slices of the three-dimensional image data set are displayed at the same time. It is also possible, as a reaction to an operating action of a user on observing images of one data set, to display images of the other image data set, for example, in an enhancing window.

It should be noted, in general, that an arbitrary display environment for scrolling through data sets containing a plurality of slices or images can be used for displaying the virtual X-ray images. In the exemplary embodiment shown here, a type of three-dimensionally rotatable mammogram is constructed so that the impression is created that individual two-dimensional mammograms are rotated during scrolling through the virtual X-ray images. This effect arises as a result of the virtual scanning geometry defined for the virtual X-ray images which finally depict a combined rotation of the X-ray source 2 and the X-ray detector 3. This has the consequence, in particular, that the same features appear at corresponding positions in the different virtual X-ray images and that therefore a simpler interpretation of the image data can be carried out. Once different observation directions have been reconstructed, it is also possible to remove masking and the like in that a different observing direction and thus a different virtual X-ray image is observed.

Although the invention has been illustrated and described in detail based on the preferred exemplary embodiment, the invention is not restricted by the examples disclosed and other variations can be derived therefrom by a person skilled in the art without departing from the protective scope of the invention.

LIST OF REFERENCE CHARACTERS

1 Tomosynthesis X-ray device
2 X-ray source
3 X-ray detector
4 Guideway
5 Arrow
6 Target region
7 Isocenter
8 Computer device
9 Communication connection
10 Detector surface
11 Orthogonal projection
12 Detector position
13 Pixel
14 Path
15 Beam section
16 Shadow
17 Straight line
18 Projection point
19 Fan
20 Step
21 Step
22 Step
23 Step
24 Step
24' Step
25 Step
26 Step
27 Step
28 Step
29 Step
30 Step
31 Control device
32 Image computer

The invention claimed is:

1. A method for reconstructing a reconstruction data set containing two-dimensional virtual X-ray images of two-dimensional projection images of a target region recorded with an X-ray device, the two-dimensional projection images having been recorded at different positions of an X-ray source along a scanning trajectory and a fixed position of an X-ray detector in fan beam geometry, which comprises the steps of:

defining an imaginary position of the X-ray source for each of the virtual X-ray images;

performing the following steps for each of the virtual X-ray images and each pixel to be reconstructed in an X-ray image:

a) defining a virtual beam section, covering the target region, of a path between the imaginary position of the X-ray source and the pixel;

b) for each of the projection images, determining an integral, found from relationships between a forward projection and a filtered back projection by re-parameterizing, along a shadow thrown onto a surface of an actual position of the X-ray detector by the virtual beam section starting from an actual position of the X-ray source during recording of an observed projection image, over filtered projection values; and c) combining a projection value of the virtual X-ray image from integrals determined in step b).

2. The method according to claim 1, which further comprises using as the scanning trajectory, a scanning trajectory which does not meet Tuy's condition.

3. The method according to claim 1, which further comprises:

pre-selecting a number of fixed scanning geometries in a region covered by the scanning trajectory; and determining for each scanning geometry, including the imaginary position of the X-ray source, the virtual X-ray image.

4. The method according to claim 1, wherein when the projection images are recorded with the X-ray detector, the virtual X-ray images are reconstructed so as to correspond to a recording of the projection images, in which the X-ray detector and the X-ray source have a same relative orientation for each of the projection images.

5. The method according to claim 1, which further comprises at least partially summing up the integrals for determining the projection value.

6. The method according to claim 5, wherein for a projection image, on coincidence of the imaginary position of the X-ray source with the actual position of the X-ray source for the projection image in question, the integral to be performed over a point is more strongly weighted than the integrals of remaining ones of the projection images.

7. The method according to claim 1, which further comprises at least partially non-linearly combining the integrals for determining the projection value.

8. The method according to claim 1, which further comprises determining the integral as a Riemann sum, a step size of which essentially corresponds to an extent of a pixel of the X-ray detector.

9. The method according to claim 1, wherein for determining the integrals in step b) for each of the projection images and each of the imaginary positions of the X-ray source, firstly, an original function projection image is initially determined in that a projection point of the imaginary position of the X-ray source is determined starting from the actual position of the X-ray source during recording of the projection image in a plane of the X-ray detector, a fan of straight lines crossing a detector surface and originating from the projection point is determined and the filtered projection values of the observed projection image are integrated for positions on the detector surface along a length of the straight lines to obtain values of the original function projection image, and the determination of the integrals in step b) is carried out by taking a difference of values of the original function projection image at edges of the shadow.

10. The method according to claim 9, which further comprises carrying out the integration for determining the original function projection images in a computation coordinate system defined by an angle and a distance from the projection point, in that rebinning of the projection image to the computation coordinate system before the integration and rebinning of the original function projection image to a Cartesian detector coordinate system following integration are carried out.

11. The method according to claim 1, which further comprises filtering projection data using a filter usable for filtered back-projection.

12. The method according to claim 1, which further comprises determining at least partially automatically reconstruction parameters used during the reconstruction of the virtual X-ray images.

13. The method according to claim 12, wherein before the reconstruction of the virtual X-ray images by means of a three-dimensional reconstruction method, reconstructing a three-dimensional image data set from the projection images and displayed, wherein following marking of at least one region of interest and/or one structure of interest by a user, the reconstruction parameters for improving at least one image property for the marked region and/or the marked structure, including maximizing a contrast, are automatically selected.

14. The method according to claim 1, which further comprises displaying the X-ray images together with the three-dimensional image data set reconstructed by means of a three-dimensional reconstruction method, from the projection images.

15. The method according to claim 14, wherein when observing image data of a data set, by means of a operator action, corresponding image data of another other data set is displayed in an enhancing window.

16. The method according to claim 1, which further comprises using as the scanning trajectory a tomosynthesis scanning trajectory.

17. The method according to claim 1, which further comprises weighting and at least partially summing up the integrals for determining the projection value.

18. The method according to claim 1, which further comprises at least partially non-linearly combining the integrals for determining the projection value, namely by using at least one of a cluster operator, a maximum operator or an operator which excludes statistical outliers.

19. The method according to claim 11, which further comprises performing the filtering step using at least one of a ramp filter, cosine weighting or redundancy compensation weighting.

20. The method according to claim 12, which further comprise:

selecting the reconstruction parameters from the group consisting of geometric parameters containing the imaginary position of the X-ray source, algorithmic parameters containing at least one of weighting parameters or filter parameters, and parameters defining a manner of combination of the integrals; and determining the reconstruction parameters in dependency on a user input.

21. The method according to claim 13, which further comprises selecting the three-dimensional reconstruction method from the group consisting of a filtered back-projection and an iterative reconstruction.

22. The method according to claim 14, which further comprises selecting the three-dimensional reconstruction method from the group consisting of filtered back-projection and iterative reconstruction.

23. The method according to claim 15, wherein the enhancing window is a lens window.

* * * * *